(12) United States Patent
Hughes et al.

(10) Patent No.: US 11,884,402 B2
(45) Date of Patent: Jan. 30, 2024

(54) HOLDER

(71) Applicant: ACRO AIRCRAFT SEATING LIMITED, Crick (GB)

(72) Inventors: Simon Hughes, Crick (GB); Andrew Wolfenden, Crick (GB)

(73) Assignee: ACRO AIRCRAFT SEATING LIMITED, Crick (GB)

( * ) Notice: Subject to any disclaimer, the term of this patent is extended or adjusted under 35 U.S.C. 154(b) by 0 days.

(21) Appl. No.: 17/248,792

(22) Filed: Feb. 8, 2021

(65) Prior Publication Data

US 2021/0245885 A1    Aug. 12, 2021

(30) Foreign Application Priority Data

Feb. 7, 2020 (GB) ...................................... 2001685

(51) Int. Cl.
 *B64D 11/06*    (2006.01)
(52) U.S. Cl.
 CPC ................................ *B64D 11/0627* (2014.12)
(58) Field of Classification Search
 None
 See application file for complete search history.

(56) References Cited

U.S. PATENT DOCUMENTS 3,946,742 A * 3/1976 Eross ..................... A61M 25/02
128/DIG. 26
3,992,034 A * 11/1976 Smith, Sr. ................. B62B 1/26
280/654
4,069,994 A * 1/1978 Wharmby ............. B65B 67/125
248/101
4,249,529 A * 2/1981 Nestor ................... A61M 25/02
248/62

(Continued)

FOREIGN PATENT DOCUMENTS

DE    3447179 C1 *   7/1986 ............. B60R 7/005
DE    29617773 U1 *  3/1997 ............. A47B 47/00
(Continued)

OTHER PUBLICATIONS

GB Patent Application No. GB2001685.3, Combined Search and Examination Report dated Nov. 11, 2020, 11 pages.
(Continued)

*Primary Examiner* — David E Allred
(74) *Attorney, Agent, or Firm* — Leber IP Law; Celia H. Leber

(57) ABSTRACT

A holder for holding a rolled-up newspaper comprises one or more elastic members and a grip that has a shaped surface for positioning against a rolled-up newspaper. When the one or more elastic members are secured to a rear surface of a vehicle seat back or to a literature pocket positioned on the rear surface of a vehicle seat back, the one or more elastic members urge the shaped surface of the grip towards the rear surface of the seat back, or of a literature pocket positioned between the grip and the rear surface of the seat back, such that when a rolled-up newspaper is positioned between the shaped surface of the grip and the rear surface of the seat back or the rear surface of the literature pocket, the newspaper is held in place between the shaped surface of the grip and the seat back or the literature pocket.

10 Claims, 6 Drawing Sheets

(56) References Cited

U.S. PATENT DOCUMENTS

| | | | | |
|---|---|---|---|---|
| 4,382,570 A * | 5/1983 | Craig | F16L 3/1025 | 24/270 |
| 5,088,635 A * | 2/1992 | Taylor | B62J 11/00 | 224/42.31 |
| 5,407,167 A * | 4/1995 | Michaelis | B60R 7/043 | 248/441.1 |
| 5,704,574 A * | 1/1998 | Kasubke | F16L 3/137 | 248/316.1 |
| 5,803,325 A * | 9/1998 | Wang | B60R 7/12 | 224/572 |
| 6,003,926 A * | 12/1999 | Labeur | B60R 7/08 | 224/572 |
| 6,318,689 B1 * | 11/2001 | Rodriguez | A47G 23/0225 | 248/205.5 |
| 6,334,562 B1 * | 1/2002 | Ament | B60R 7/005 | 224/543 |
| 6,434,796 B1 * | 8/2002 | Speirs | A61M 16/0672 | 24/336 |
| 9,261,912 B2 * | 2/2016 | Bell | A45C 11/00 | |
| 9,457,731 B2 * | 10/2016 | Narayanan | B60R 11/02 | |
| 2005/0173483 A1 * | 8/2005 | Ravikumar | B60R 7/12 | 224/483 |
| 2009/0039122 A1 * | 2/2009 | Antonioni | B60R 7/005 | 224/250 |
| 2009/0065540 A1 * | 3/2009 | Pantoja | B64D 11/0627 | 224/275 |
| 2010/0147918 A1 * | 6/2010 | Hensley | B62J 9/26 | 224/653 |
| 2011/0101054 A1 * | 5/2011 | Wicinski | B60R 7/043 | 224/275 |
| 2013/0068919 A1 * | 3/2013 | Antonioni | A47B 13/00 | 248/614 |
| 2016/0016491 A1 * | 1/2016 | Correia | B60N 2/682 | 296/64 |
| 2016/0174633 A1 * | 6/2016 | Macrae | A45F 3/04 | 2/69.5 |
| 2016/0249073 A1 | 8/2016 | Margis et al. | | |
| 2016/0353850 A1 * | 12/2016 | Halpern | A45C 13/1046 | |
| 2017/0291710 A1 * | 10/2017 | Barr-Perea | B61D 33/0007 | |
| 2019/0099187 A1 * | 4/2019 | Theodorou | A45C 3/001 | |
| 2019/0176716 A1 * | 6/2019 | Atkinson | B60R 5/04 | |
| 2019/0283644 A1 * | 9/2019 | Smith | B60N 3/004 | |

FOREIGN PATENT DOCUMENTS

| | | | | |
|---|---|---|---|---|
| DE | 19752386 A1 | 5/1999 | | |
| DE | 102014018893 B3 | 1/2016 | | |
| EP | 1028023 A2 | 8/2000 | | |
| FR | 2859163 A1 * | 3/2005 | | B60R 7/005 |
| FR | 2992607 A1 * | 1/2014 | | B60R 7/005 |
| GB | 2526776 A1 | 12/2015 | | |

OTHER PUBLICATIONS

European Patent Application No. 21155812.7-1010, Extended European Search Report dated Jun. 22, 2021, 8 pages.

* cited by examiner

HOLDER

CROSS REFERENCE TO RELATED APPLICATION

This application claims priority to United Kingdom Patent Application No. 2001685.3 filed Feb. 7, 2020, which is incorporated herein by reference in its entirety.

TECHNICAL FIELD

The present invention relates to a holder for use on an aircraft seat, in particular to a holder which is capable of carrying a newspaper.

BACKGROUND ART

It is usual to provide a literature pocket on the rear of an aircraft seat. Typically, such pockets will take the form of either a pouch or a bungee arrangement in which magazines, safety information leaflets and personal items can be stored.

Whilst it is usual for newspapers to be handed to passengers as they board an aircraft, newspapers are often too large to fit in the literature pocket, unless they are folded. Unfortunately, a folded newspaper is usually very bulky which means it can take up a large amount of space in what is usually a small literature pocket. This leaves little room for anything else to be held within the literature pocket and, if the literature pocket is already holding several items, it can be difficult to fit the newspaper within the literature pocket. This often means that newspapers are simply discarded onto the seats or floor of the aircraft cabin which is not only unsightly, but creates a safety hazard.

It is, therefore, an object of the present invention to seek to alleviate the above identified problems.

SUMMARY OF THE INVENTION

According to one aspect of the present invention, there is provided a holder for holding a rolled-up newspaper, wherein the holder comprises one or more elastic members and a grip, wherein the grip comprises a shaped surface for positioning against a rolled-up newspaper, wherein, when the one or more elastic members are secured to a rear surface of a vehicle seat back or to a literature pocket positioned on the rear surface of the vehicle seat back, the one or more elastic members urge the shaped surface of the grip towards the rear surface of the seat back or the rear surface of the or a literature pocket positioned between the grip and the rear surface of the seat back such that when a rolled-up newspaper is positioned between the shaped surface of the grip and the rear surface of the seat back or the rear surface of the literature pocket, the newspaper is held in place between the shaped surface of the grip and the seat back or the literature pocket.

Preferably, the one or more elastic members comprising one or more elastic cords and/or elastic bands.

Preferably, the grip is positioned in a central area of the holder.

Preferably, the one or more elastic members project outwardly from the grip.

Preferably, the one or more elastic members form a plurality of arms projecting outwardly from the grip.

Preferably, the one or more elastic members form between about 2 and about 10 arms projecting outwardly from the grip.

Preferably, the one or more elastic members form between about 4 and about 8 arms projecting outwardly from the grip.

Preferably, the one or more elastic members form about 6 arms projecting outwardly from the grip.

Preferably, the grip is positioned in a central area of the holder and the one or more elastic members form a plurality of arms projecting outwardly from the grip.

Preferably, when attached to a seat back of a vehicle seat or a literature pocket, the grip is positioned in a central area of the holder and the one or more elastic members form a plurality of arms projecting outwardly from the grip.

Preferably, the grip and the one or more elastic members have an insect appearance. Put another way, preferably, the grip and one or more elastic members form a body and a plurality of legs, preferably six legs.

Preferably, the shaped surface is a recessed surface.

Preferably, the shaped surface is curved.

Preferably, the shaped surface is a concave surface.

Preferably, the shaped surface comprises a V-shape, for example when viewed from above.

Preferably, the grip comprises a handle for pulling the grip in a direction away from the rear surface of a seat back.

Preferably, the handle comprises a recess in the grip. Preferably, the recess forms a storage area, for example for one or more personal items.

Preferably, the recess is a curved recess.

Preferably, the shaped surface of the grip comprises a high friction surface.

Preferably, the shaped surface of the grip comprises a high friction material.

Preferably, the shaped surface of the grip comprises a deformable material.

Preferably, the shaped surface of the grip comprises a foam or rubber material.

Preferably, the shaped surface of the grip comprises a plurality of ridges.

Preferably, the grip comprises a deformable material on a seat back facing surface of the grip.

This is particularly advantageous because it protects the seat back and/or a literature pocket positioned between the grip and the seat back from being damaged by the grip.

Preferably, the shaped surface forms one or more seat back facing edges and the deformable material is positioned on one or more of said seat back facing edges.

Preferably, the shaped surface forms two seat back facing edges and the deformable material is positioned on one or both of said seat back facing edges.

Preferably, the deformable material comprises a rubber material.

Preferably, the deformable material comprises a foam material.

Preferably, the deformable material is provided over at least a part of the seat back facing surface or one or more seat back facing edges of the grip.

Preferably, the deformable material is provided over at least about 50% of the seat back facing surface or one or more seat back facing edges of the grip.

Preferably, the deformable material is provided over at least about 75%, preferably at least about 85%, preferably at least about 95% of the seat back facing surface or one or more seat back facing edges of the grip.

Preferably, the deformable material is provided over substantially all of the seat back facing surface or one or more seat back facing edges of the grip.

According to another aspect of the present invention, there is provided a literature pocket for an aircraft seat, the literature pocket comprising a holder as described herein positioned against the literature pocket.

Preferably, the holder is attached to the literature pocket.

Preferably, when attached to the literature pocket, the grip is positioned in a central area of the holder and the one or more elastic members form a plurality of arms projecting outwardly from the grip.

Preferably, when the literature pocket is secured to the rear surface of a seat back, a rolled-up newspaper can be held by the holder positioned between the grip and the literature pocket.

According to another aspect of the present invention, there is provided a literature pocket for a vehicle seat, the literature pocket comprising a holder for holding a rolled-up newspaper, wherein the holder comprises one or more elastic members and a grip, wherein, when the one or more elastic members are secured to a rear surface of a vehicle seat back or to the literature pocket, the one or more elastic members urge the grip towards the literature pocket such that when a rolled-up newspaper is positioned between the grip and the literature pocket, the newspaper is held in place between the grip and the literature pocket.

Preferably, the holder is attached to the literature pocket, preferably to a rear surface of the literature pocket.

Preferably, the literature pocket comprises an attachment means for attaching the one or more elastic members to the literature pocket.

Preferably, the attachment means comprises one or more holes, loops and/or channels through which the one or more elastic members can be threaded.

Preferably, the attachment means comprises one or more holes, loops and/or channels positioned at or near each lateral edge of the literature pocket through which the one or more elastic members can be threaded.

Preferably, the attachment means comprises one or more holes, loops and/or channels positioned at or near the base of the literature pocket through which the one or more elastic members can be threaded.

Preferably, the attachment means comprises one or more holes, loops and/or channels positioned at or near each lateral edge of the literature pocket and at or near the base of the literature pocket through which the one or more elastic members can be threaded.

In another aspect of the present invention, there is provided a seat back comprising a holder as described herein.

Preferably, the holder is attached to the rear surface of the seat back.

Preferably, the seat back comprises an attachment means for attaching the one or more elastic members to the seat back.

Preferably, the attachment means comprise one or more holes, loops and/or channels in or on the rear surface of the seat back.

Preferably, the attachment means comprises a plurality of holes, loops and/or channels through which the one or more elastic members can be threaded.

Preferably, the seat back comprises a literature pocket positioned between the holder and the rear surface of the seat back.

Preferably, the literature pocket comprises an attachment means for attaching the one or more elastic members to the literature pocket.

Preferably, the attachment means comprises one or more holes, loops and/or channels through which the one or more elastic members can be threaded.

Preferably, the attachment means comprises one or more holes, loops and/or channels positioned at or near each lateral edge of the literature pocket through which the one or more elastic members can be threaded.

Preferably, the attachment means comprises one or more holes, loops and/or channels positioned at or near the base of the literature pocket through which the one or more elastic members can be threaded.

Preferably, the attachment means comprises one or more holes, loops and/or channels positioned at or near each lateral edge of the literature pocket and at or near the base of the literature pocket through which the one or more elastic members can be threaded.

Preferably, the literature pocket is on the rear surface of the seat back.

Preferably, the literature pocket is a lower literature pocket. That is, the literature pocket is provided in a lower region of a seat back.

According to another aspect of the present invention, there is provided a seat back for a vehicle seat comprising a literature pocket as described herein.

According to a further aspect of the present invention, there is provided a seat back for a vehicle seat, wherein the seat back comprises a literature pocket for holding literature and a holder for holding a rolled-up newspaper, wherein the holder comprises one or more elastic members and a grip, wherein the one or more elastic members are secured to a rear surface of the seat back and urge the grip towards the literature pocket such that when a rolled-up newspaper is positioned between the grip and the literature pocket, the newspaper is held in place between the grip and the literature pocket.

According to another aspect of the present invention, there is provided a seat back for a vehicle seat, wherein the seat back comprises a literature pocket for holding literature and a holder for holding a rolled-up newspaper, wherein the holder comprises one or more elastic members and a grip, wherein the one or more elastic members are secured to the literature pocket and urge the grip towards the literature pocket such that when a rolled-up newspaper is positioned between the grip and the literature pocket, the newspaper is held in place between the grip and the literature pocket.

According to a further aspect of the present invention, there is provided a vehicle seat or a row of vehicle seats comprising a holder, literature pocket and/or seat back as described herein.

Preferably, the seat or row of seats is an aircraft seat or row of aircraft seats.

Preferably, reference made herein to a "seat back" means a "vehicle seat back", preferably an "aircraft seat back".

Within this specification, reference to "front", for example of a seat back, is with reference to the direction faced by a person sitting in a seat comprising a seat back. For example, the front surface of a seat back is the surface of a seat back that a person rests against when sitting in a seat comprising the seat back. It will be appreciated that reference to "rear" means the opposite surface of a seat back, i.e. the surface of a seat back in front of a passenger sitting in a seat behind the seat comprising said seat back. As will be appreciated, it is this rear surface of a seat back to which a literature pocket is routinely attached.

Preferably, the one or more elastic members comprises one or more elastic cords and/or elastic bands.

Preferably, the one or more elastic members comprise one or more bungee cords.

Within this specification, reference to "substantially all" includes reference to "all".

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein and vice versa.

It will be appreciated that reference to "one or more" includes reference to "a plurality".

BRIEF DESCRIPTION OF THE DRAWINGS

Example embodiments of the present invention will now be described with reference to the accompanying FIGS., in which.

The present invention relates to a holder for use on an aircraft seat, in particular to a holder for holding a rolled-up newspaper or magazine. In particularly preferred examples, the holder is provided to the rear of a literature pocket, for example a lower literature pocket.

Figure 1:
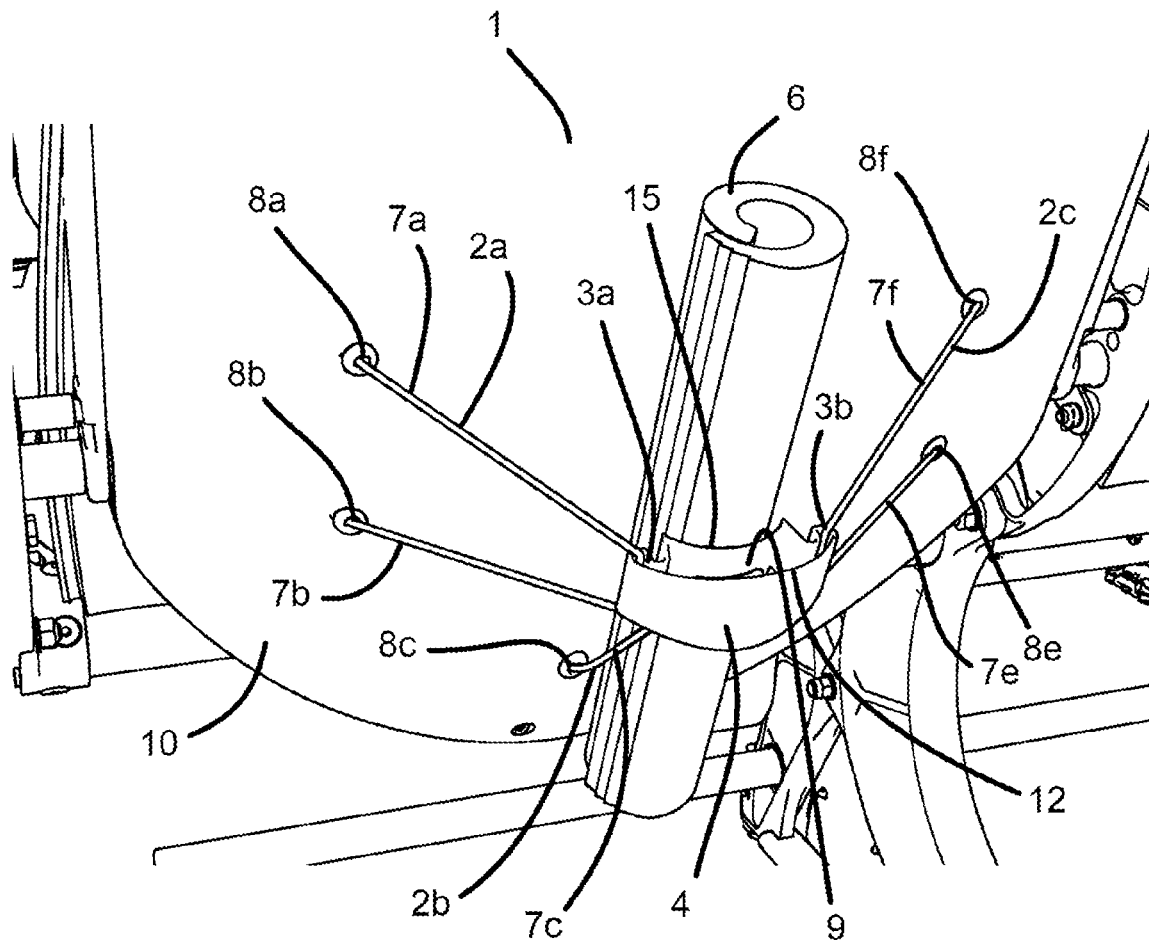
FIG. 1 shows a first embodiment of the present invention without a literature pocket.
Figure 2:
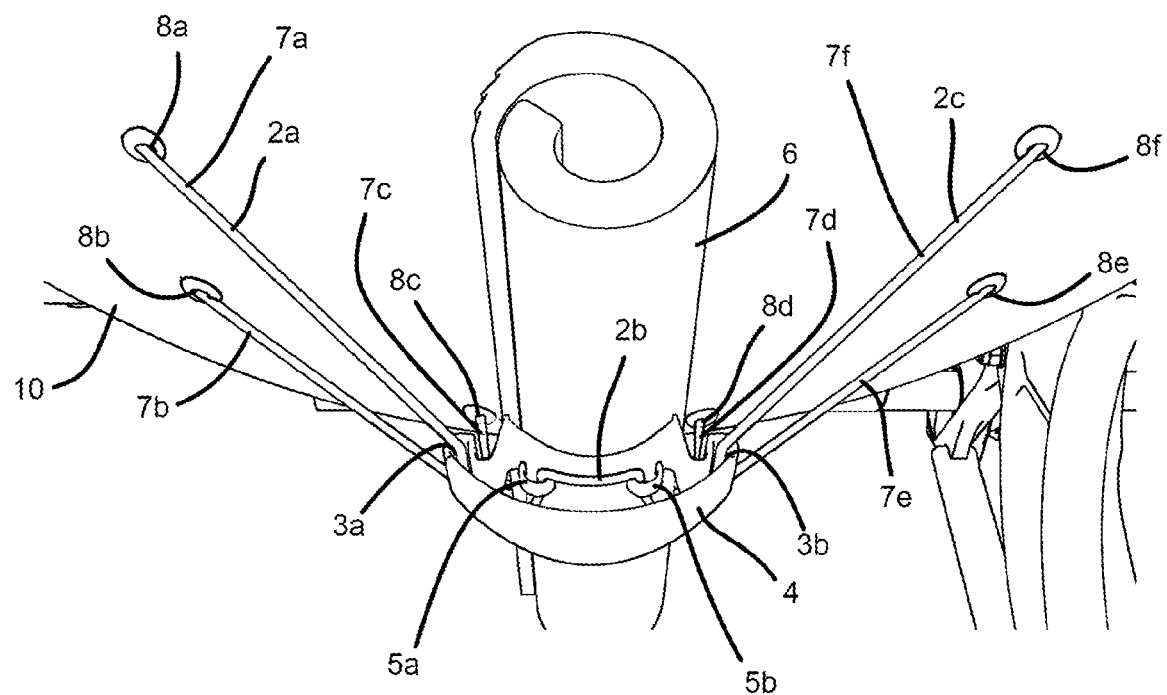
FIG. 2 shows another view of the first embodiment of the present invention without a literature pocket.

With respect to FIGS. 1 and 2, a first example of a holder 1 is shown comprising three elastic cords 2a, 2b, 2c and a grip 4. The first elastic cord 2a is fed through slot 3a on the left side of the grip 4 and through holes 8a and 8b in the seat back. The second elastic cord 2b is fed through a pair of eyelets 5a and 5b in the base of the grip 4 and through holes 8c and 8d in the seat back. The third elastic cord 2c is fed through slot 3b on the right side of the grip 4 and through holes 8e and 8f in the seat back.

Positioned in this way, the cords form arms 7a, 7b, 7c, 7d, 7e and 7f projecting outwardly from the grip 4 and connecting the grip to the seat back 10 via the holes 8a, 8b, 8c, 8d, 8e and 8f.

The end of each cord 2a, 2b, 2c is positioned on the front surface of the seat back 10 and prevented from passing through the respective hole by being secured to the seat back or provided with a suitable mechanical element such as a metal bar or metal plate (not shown) to which the end of the cord is attached. It will be appreciated that the front of the seat back 10 is the passenger receiving side of the seat back 10. The rear of the seat back 10 is visible in the FIGS.

Whilst in the example shown, three separate elastic cords 2a, 2b, 2c are used, it will be appreciated that, alternatively, a single elastic cord could be used. In such an example, the elastic cord is fed through the first hole 8a in the seat back 10 from the front of the seat back 10. The cord 2 is then fed into one end of the slot 3a on the left-hand side of the grip 4 and out of the opposing end, before being fed through the second hole 8b in the seat back 10 from the rear of the seat back 10. The cord 2 is then fed through the third hole 8c in the seat back 10 from the front of the seat back 10, before being fed through eyelets 5a, 5b at the base of the grip 4. The cord 2 is then fed through the fourth hole 8d in the seat back 10 from the rear of the seat back 10, before being fed through the fifth hole 8e in the seat back 10 from the front of the seat back 10. The cord 2 is then fed into one end of the slot 3b on the right-hand side of the grip 4 and out of the opposing end, before being fed through the sixth hole 8f in the seat back 10 from the rear of the seat back 10. In this example, the cord is arranged as described above such that the two ends of the cord 2 protrude from first and sixth holes 8a and 8f at the front of the seat back 10. As with the example shown in the FIGS. in which three separate cords 2a, 2b and 2c are used, the ends of the cord 2 protruding from said holes 8a, 8f can then be secured to the seat back or provided with a suitable mechanical element such as a metal bar or metal plate (not shown) to which the end of the cord is attached, so that the two ends on the cord 2 cannot pass back through the holes 8a, 8f.

In the examples shown, first and second holes 8a and 8b are positioned towards the left hand edge of the seat back 10, third and fourth holes 8c and 8d are positioned towards the base of the seat back 10 and fifth and sixth holes 8e and 8f are positioned towards the right hand edge of the seat back 10.

In other examples, as shown with reference to FIGS. 3 to 7, a holder 1 can be attached to a literature pocket 11, which is positioned in the lower region on the rear surface of a seat back 10, rather than being attached directly to the seat back 10. In this example, the literature pocket 11 comprises a channel 13a at the left-hand lateral edge of the literature pocket 11, a channel 13b at the base of the literature pocket 11 and a channel 13c at the right-hand lateral edge of the literature pocket 11. In this example, three elastic cords 2a, 2b, 2c are used. One cord 2a is inserted into one end of the left-hand channel 13a and out of the opposing end, before being inserted into one end of the left-hand slot 3a of the grip 4 and out of the opposing end. The two free ends of the cord are then fixed together. Two more cords 2b, 2c are then used in the same way to join the base 13b to the eyelets 5a, 5b of the grip 4 and to join the right-hand channel 13c to the right-hand slot 3b of the grip 4.

As with the example shown in FIGS. 1 and 2, whilst the provision of three cords 2a, 2b, 2c is shown, it will be appreciated that, alternatively, a single cord could be used in the same configuration as described above in relation to FIGS. 1 and 2.

The grip 4 comprises a concave curved surface 15 which, in use, faces the rear of the seat back 10 of the aircraft seat. The grip 4 further comprises a handle 12, which enables the user to pull the grip 4 away from the seat back 10 when they wish to use the holder 1. For example, the user can pull the grip 4 away from the seat back 10, thus stretching the elastic cord/s 2, and place an object 6 such as a rolled-up newspaper between the grip 4 and the seat back 10. The user can then release the grip 4 allowing the curved surface 15 to engage the object, and allowing the elastic cord/s 2 to contract and urge the grip 4 towards the seat back 10, thus securing the object between the rear surface of the seat back 10 and the curved surface 15 of the grip 4.

Figure 8:
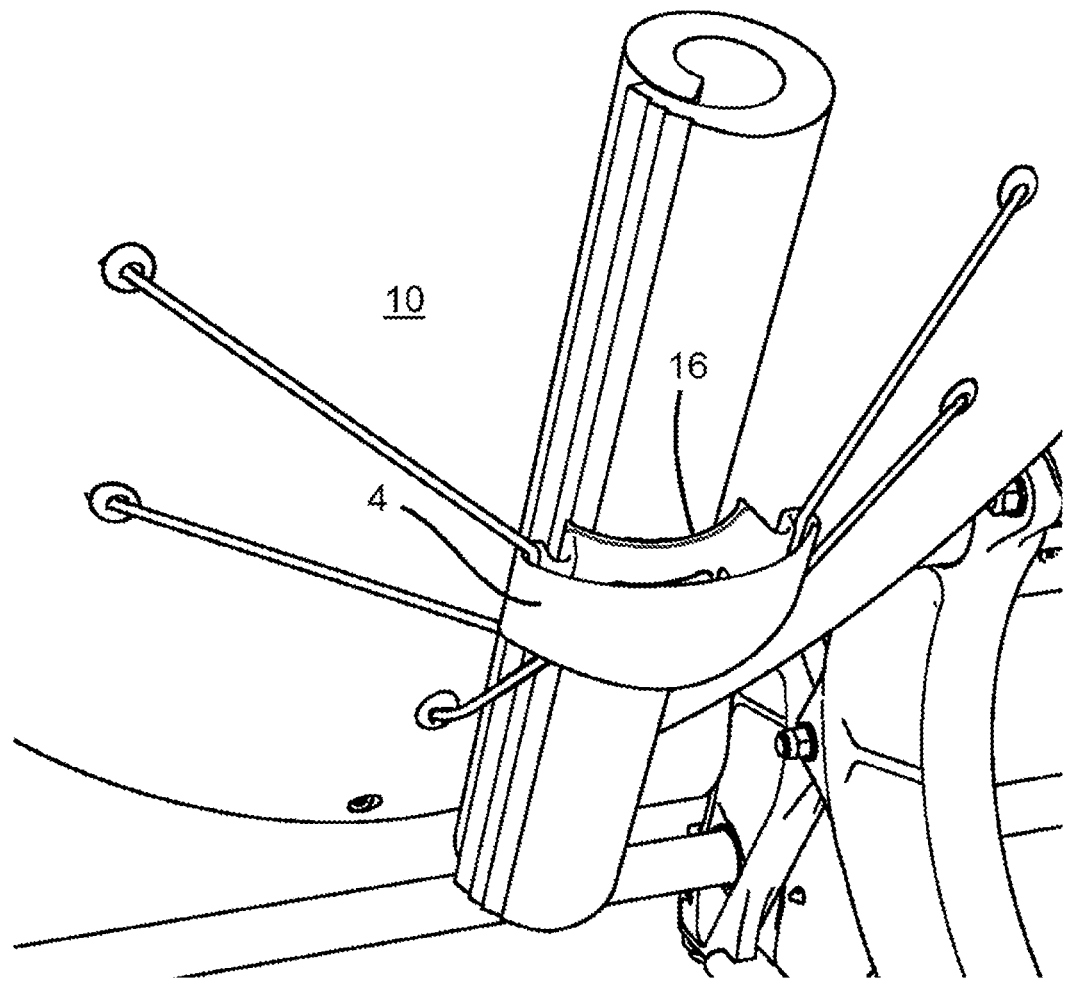
FIG. 8 shows a modified version of the invention shown in FIGS. 1 and 2.

In some examples, as shown in FIG. 8, the curved surface 15 of the grip 4 can include a high friction material in order to restrict movement of the object 6 as much as possible when the object 6 is held within the holder 1. The curved surface 15 of the grip 4 may also or alternatively include a deformable material such that the shape of the curved surface 15 can adapt to suit objects of different sizes and shapes. For example, the curved surface 15 of the grip 4 may include a rubber material having ridges along its surface to increase the friction between the surface 15 and an object 6 being held by the holder. As shown in FIG. 8, the curved grip can be provided with a deformable rubber material 16 on the seat back facing surface of the grip 4. This protects the seat back 10, or the literature pocket 11, from damage resulting from repeated contact therewith by the grip 4.

In the example shown in FIGS. 1 to 4, the handle 12 includes a pocket 9 which can be used as a storage area for small personal items. Alternatively, as shown in FIGS. 5 and 6 a grip 4' can be provided without a pocket.

Figure 3:
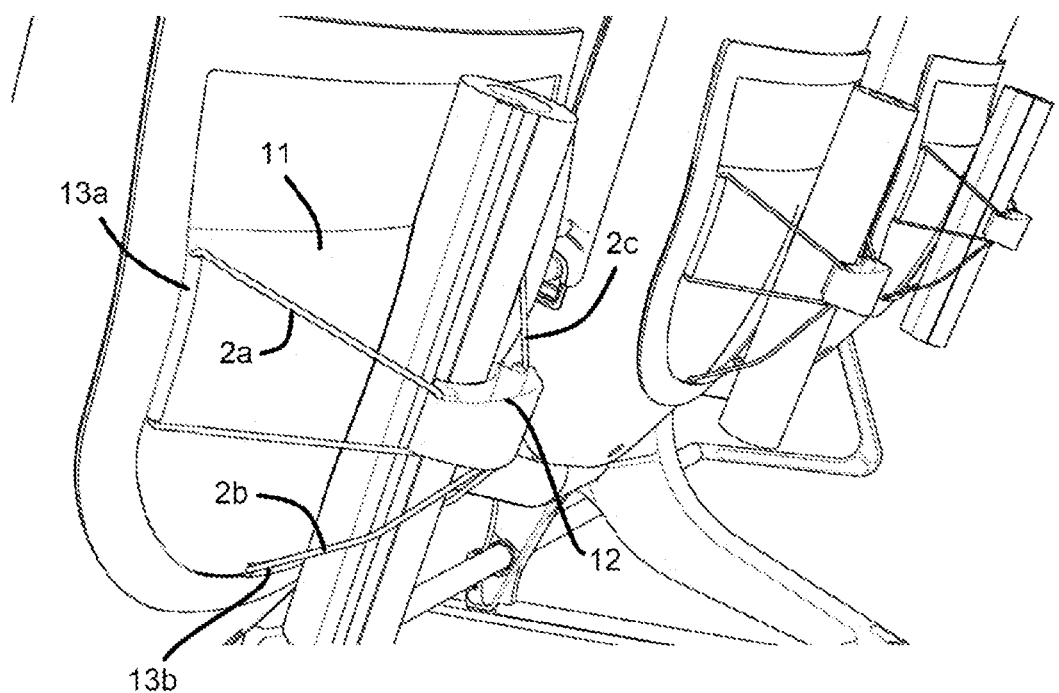
FIG. 3 shows a second embodiment of the present invention, with a literature pocket.
Figure 4:
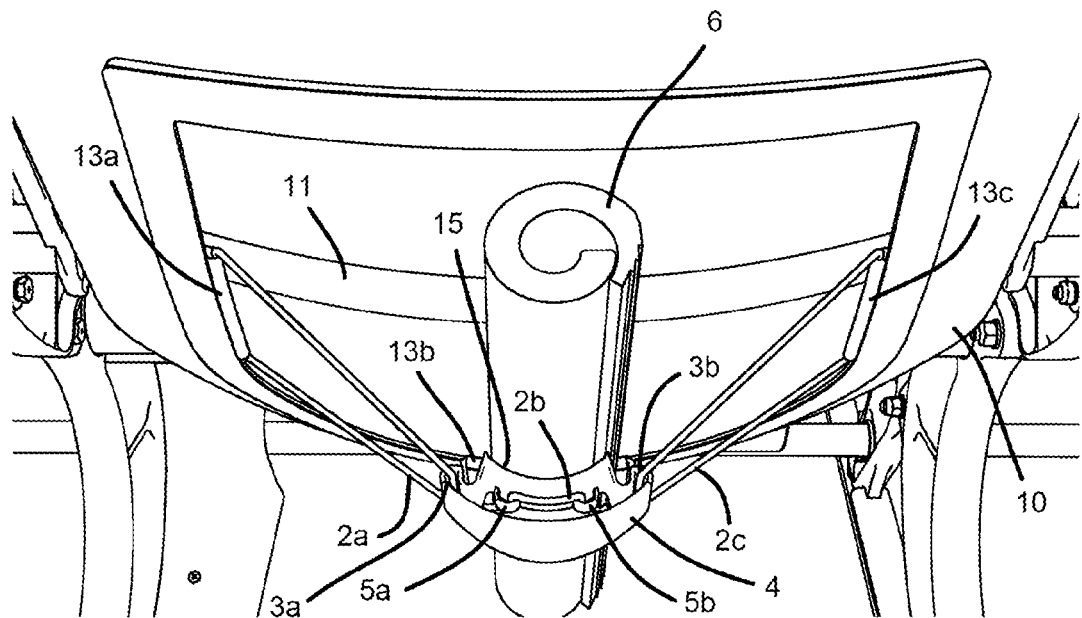
FIG. 4 shows another view of the second embodiment of the present invention, with a literature pocket.
Figure 5:
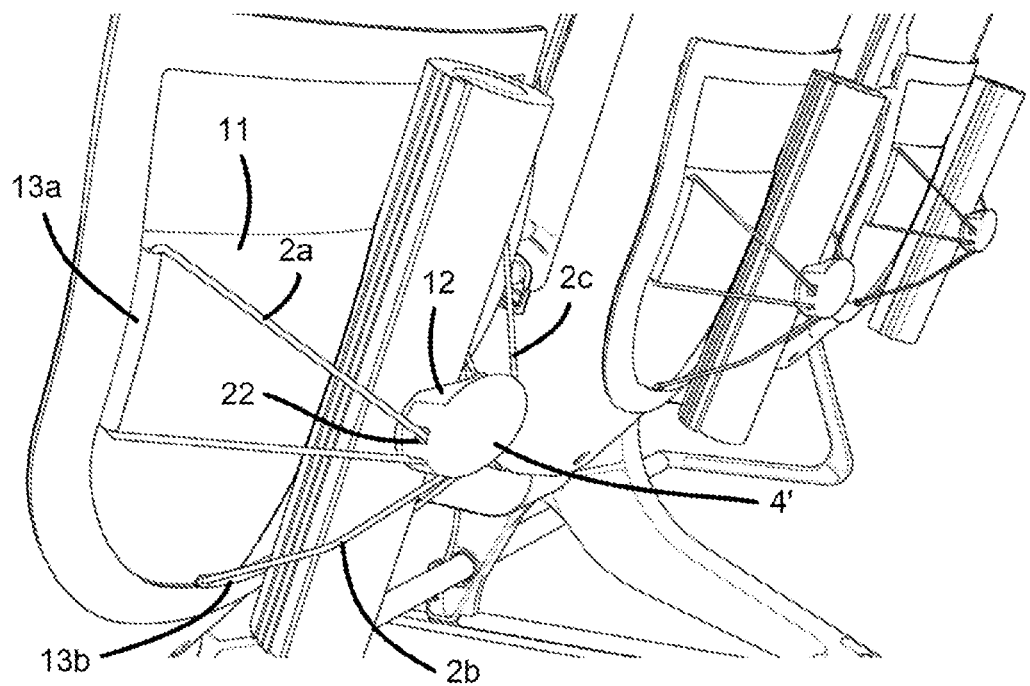
FIG. 5 shows a third embodiment of the present invention, with a literature pocket.
Figure 6:
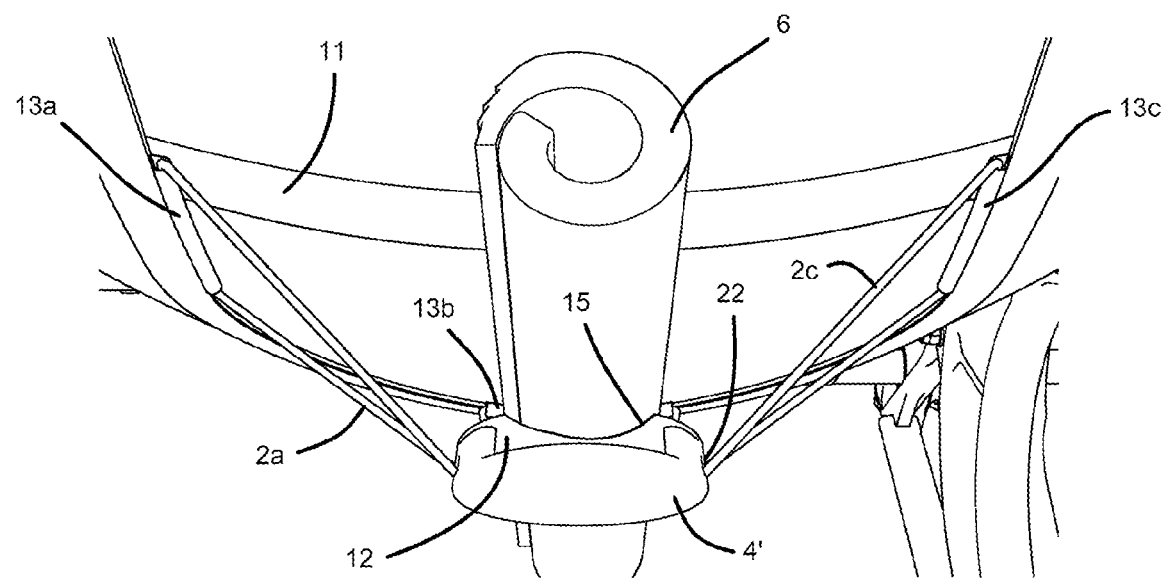
FIG. 6 shows another view of the third embodiment of the present invention, with a literature pocket.
Figure 7:
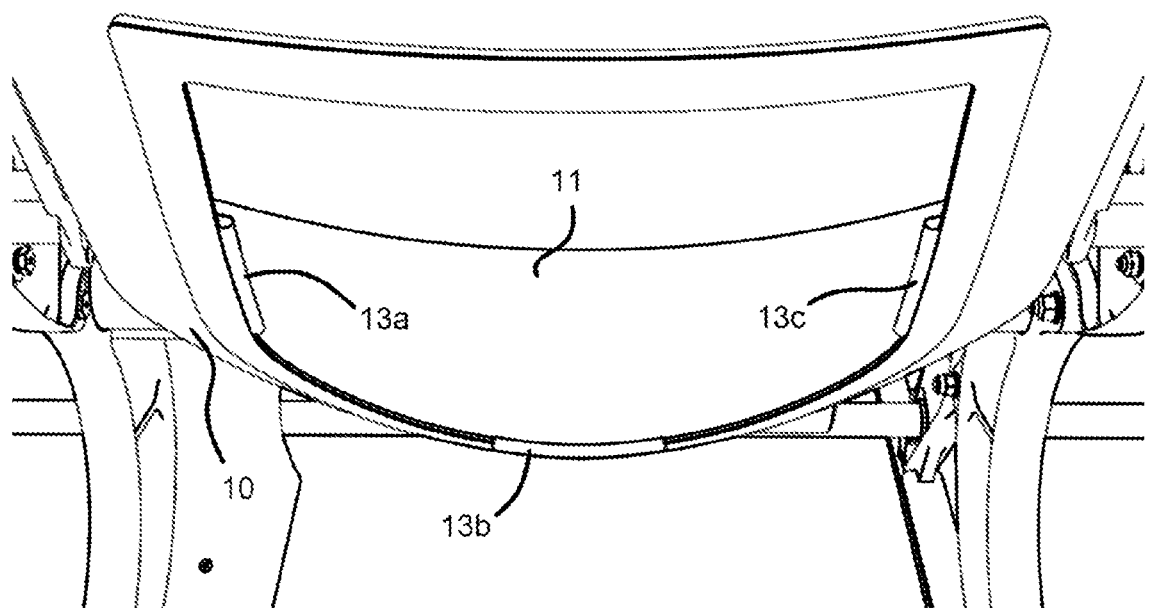
FIG. 7 shows a literature pocket comprising channels at each lateral edge and at the base of the literature pocket.

Whilst the grip 4' shown in FIGS. 5 and 6 differs slightly to the grip 4 shown in FIGS. 1 to 4, it can be attached to the seat back 10 or the literature pocket 11 in a similar way via pairs of apertures 22, on its left-hand side, base and right hand side.

As with the example shown in FIGS. 3 and 4, in FIGS. 5 and 6 three elastic cords 2a, 2b, 2c are used. One cord 2a is inserted into one end of the left-hand channel 13a and out of the opposing end, before being inserted through a first pair of apertures 22 on the left-hand side of the grip 4'. Two more cords 2b, 2c are then used in the same way to join the base 13b to the base of the grip via a second pair of apertures at the base of the grip and to join the right-hand channel 13c to the right-hand side of the grip via a third pair of apertures.

As will be appreciated, in the examples discussed above with reference to FIGS. 3 to 6 in which three elastic cords are used, it will be appreciated that a single elastic cord could be used, for example, in a similar alternative arrangement to that described above in relation to FIGS. 1 and 2, with the cord being fed through the channels 13a, 13b, 13c via the ends of the channels instead of through the holes 8.

Figure 9:
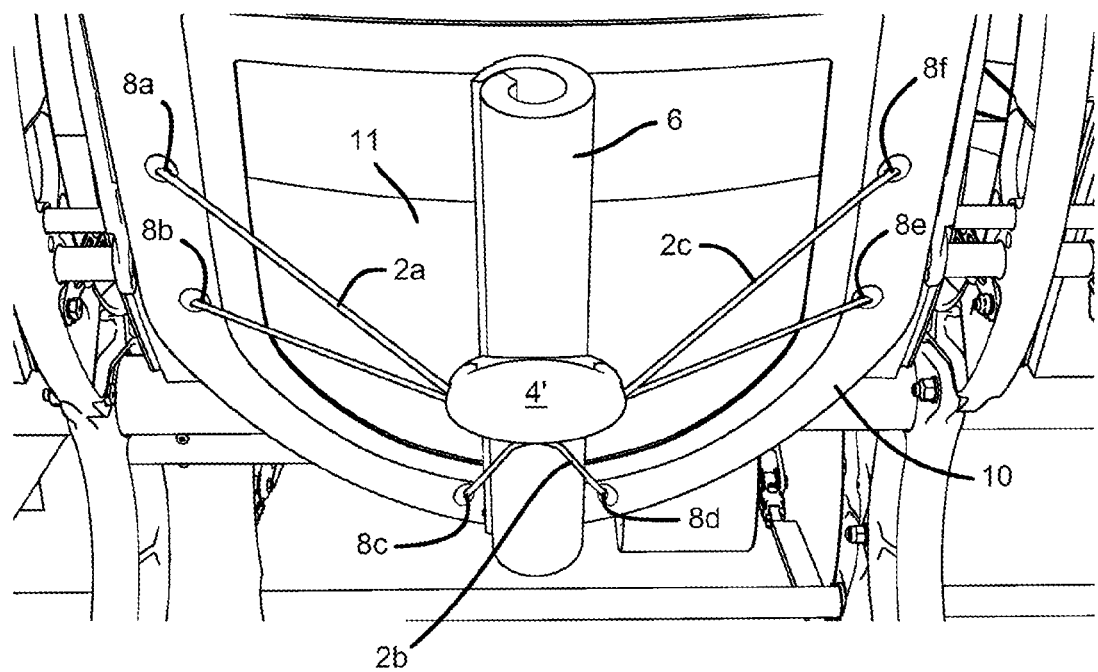
FIG. 9 shows a fourth embodiment of the present invention with a literature pocket.

With reference to FIG. 9, an alternative example of the present invention is shown in which a literature pocket 11 is provided between the grip 4 and the seat back 10 but in which the cords 2a, 2b and 2c are attached to the seat back 10 in the same way as described and shown with reference to FIGS. 1 and 2, rather than directly to the literature pocket 11 as shown with reference to FIGS. 3 to 7. Again, as will be appreciated, a single cord could alternatively be used, as described above.

The length of the elastic cord/s used should be such that the curved surface of the grip is in contact with or is close to the seat back 10 or literature pocket 11. This ensures that the object 6 being held by the holder 1 is pressed with sufficient force against the seat back 10 or literature pocket 11 to hold it in place.

Within this specification, the term "about" means plus or minus 20%, more preferably plus or minus 10%, even more preferably plus or minus 5%, most preferably plus or minus 2%.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications are covered by the appended claims.

The invention claimed is:

1. A device for a vehicle seat, the device comprising:
a holder for holding a rolled-up newspaper and a literature pocket having a rear surface distinct from a rear surface of a seat back of the vehicle seat, wherein the holder comprises one or more elastic members and a grip,
wherein the literature pocket comprises an attachment means for attaching the one or more elastic members to the literature pocket at a plurality of attachment points and the grip has a curved surface, the curved surface having a curvature configured for positioning against a rolled-up newspaper,
wherein the grip comprises an element separate from the one or more elastic members and the grip interconnects oppositely positioned portions of the one or more elastic members such that the one or more elastic members and the grip together completely span between the attachment points; and
wherein, when the one or more elastic members are secured to the literature pocket positioned on the rear surface of a vehicle seat back, the one or more elastic members urge the curved surface of the grip towards the rear surface of the literature pocket, the rear surface of the literature pocket being positioned between the grip and the rear surface of the seat back such that when a rolled-up newspaper is positioned between the curved surface of the grip and the rear surface of the literature pocket, the newspaper is held in place between the curved surface of the grip and the literature pocket and literature held within the literature pocket is separated from the grip by the rear surface of the literature pocket.

2. The device according to claim 1, wherein the attachment means comprises one or more holes, loops and/or channels positioned at or near each lateral edge of the literature pocket through which the one or more elastic members can be threaded.

3. The device according to claim 1, wherein the attachment means comprises one or more holes, loops and/or channels, positioned at or near a base of the literature pocket, through which the one or more elastic members can be threaded.

4. A vehicle seat comprising a literature pocket according to claim 1.

5. The device according to claim 1 wherein the curved surface is concave, with its concavity facing the seat back.

6. The device according to claim 1 wherein when a newspaper is positioned in the holder a radius of curvature of the curved surface extends generally perpendicular to a longitudinal axis of the newspaper.

7. The device according to claim 6 wherein the elastic members are threaded through slots in the grip.

8. The device according to claim 1 wherein the grip is positioned generally centrally relative to the literature pocket, with the elastic members radiating outwardly from the grip towards edges of the literature pocket.

9. The device according to claim 1 wherein the curved surface defines a recess configured to receive the rolled up newspaper.

10. The device according to claim 1 wherein the grip further comprises a handle, on a side of the grip opposite to the curved surface, configured to enable the user to pull the grip away from the seat back, stretching the elastic members, hold the grip in this position while inserting a rolled up newspaper against the literature pocket, and release the grip allowing the curved surface to engage the newspaper.

* * * * *